United States Patent [19]

Seinen et al.

[11] Patent Number: 6,002,598
[45] Date of Patent: Dec. 14, 1999

[54] SWITCHED-MODE POWER SUPPLY HAVING AN IMPROVED START-UP CIRCUIT

[75] Inventors: Erwin G. R. Seinen, Nijmegen, Netherlands; Naveed Majid, Mohegan Lake, N.Y.

[73] Assignee: U.S. Philips Corporation, New York, N.Y.

[21] Appl. No.: 09/062,169

[22] Filed: Apr. 17, 1998

[30] Foreign Application Priority Data

Apr. 25, 1997 [EP] European Pat. Off. ............. 97201245

[51] Int. Cl.⁶ .................................................. H02M 7/517
[52] U.S. Cl. ................................................. 363/49; 363/20
[58] Field of Search .................................. 363/16, 20, 21, 363/18, 19, 49, 97, 131, 55, 56; 323/901, 908

[56] References Cited

U.S. PATENT DOCUMENTS 5,581,453  12/1996  Ueta et al. .................................. 363/49
5,812,383   9/1998  Majid et al. ................................ 363/21
5,841,643  11/1998  Schenkel .................................... 363/21

FOREIGN PATENT DOCUMENTS

0585788A1  3/1994  European Pat. Off. .

Primary Examiner—Robert E. Nappi
Assistant Examiner—Y. J. Han
Attorney, Agent, or Firm—Edward W. Goodman

[57] ABSTRACT

A switched-mode power supply includes a transformer (TR) provided with a primary winding (P) having a first primary terminal (1), coupled to receive a voltage (U) with respect to a ground terminal (GND), and a second primary terminal (2); a controllable switch (SM) coupled between the second primary terminal (2) and the ground terminal (GND); and a start-up circuit (ST) for starting up the switched-mode power supply. The start-up circuit (ST) includes a field effect transistor (T) of the normally-on type having a drain coupled to the second primary terminal (2), a source, and a gate. The start-up circuit (ST) further includes a voltage stabilizer (VS) for supplying an internal supply voltage to an internal supply terminal (VINT), the voltage stabilizer (VS) being coupled to the source.

8 Claims, 1 Drawing Sheet

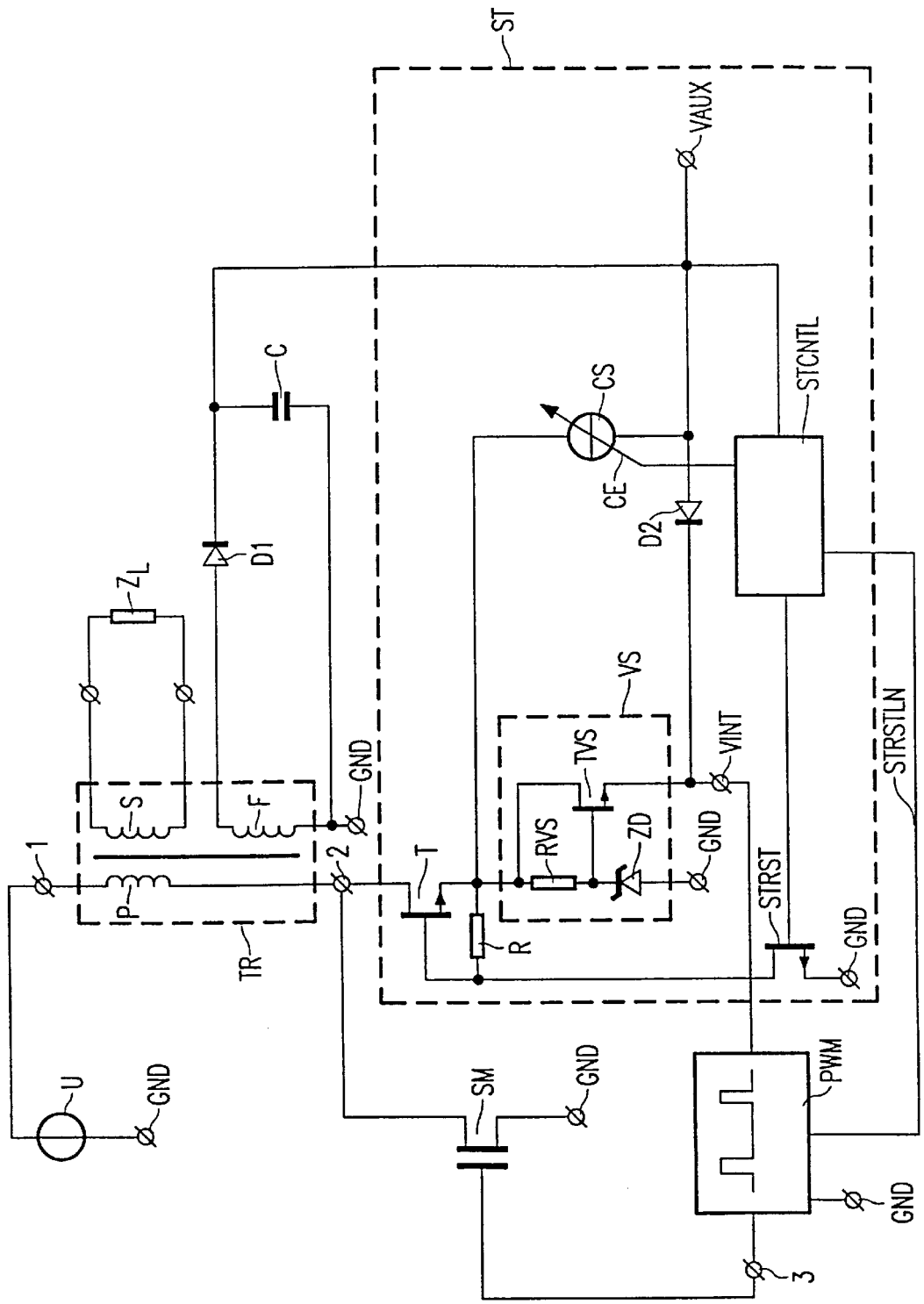

SWITCHED-MODE POWER SUPPLY HAVING AN IMPROVED START-UP CIRCUIT

BACKGROUND OF THE INVENTION

1. Field of the Invention

The invention relates to a switched-mode power supply comprising a transformer provided with a primary winding having a first primary terminal, coupled to receive a voltage with respect to a ground terminal, and a second primary terminal; switching means coupled between the second primary terminal and the ground terminal; and a start-up circuit for starting up the switched-mode power supply, the start-up circuit comprising a field effect transistor of the normally-on type having a drain electrode coupled to the second primary terminal, a source electrode, and a gate electrode.

2. Description of the Related Art

Such a switched-mode power supply is known from European Patent Specification EP 0 585 788 A1. Said Specification describes a switched-mode power supply for use in an integrated circuit which does not require a separate IC terminal for supplying power to the start-up circuit. The start-up circuit is powered from the source of a junction field effect transistor, the junction field effect transistor being coupled in series between the switching means and the second primary terminal.

SUMMARY OF THE INVENTION

It is an object of the invention to provide a switched-mode power supply having an improved start-up circuit.

To this end, according to the invention, the switched-mode power supply of the type defined in the opening paragraph is characterized in that the start-up circuit further comprises a voltage stabilizer for supplying an internal supply voltage to an internal supply terminal, the voltage stabilizer being coupled to the source electrode. Thus, it is achieved that the internal supply voltage is not unnecessarily high. An advantage of this is that it limits the dissipation of the necessary electronic circuitry coupled to the internal supply terminal.

An embodiment of a switched-mode power supply in accordance with the invention is characterized in that the gate electrode of the field effect transistor is coupled to the source electrode via a resistor, and the start-up circuit further comprises a switching transistor having a main current path coupled between the gate electrode and the ground terminal. During a start-up phase of the switched-mode power supply, the field-effect transistor must be conductive. During the start-up phase, the main current path of the switching transistor is not conductive. As a result of this, the resistor does not carry current so that there is no voltage difference between the gate electrode and the source electrode of the field effect transistor. Since the field effect transistor is of the normally-on type, for example a junction field-effect transistor, the field-effect transistor is conductive. After the start-up phase, the main current path of the switching transistor is conductive. The resistor consequently carries current, as a result of which there is a voltage difference between the gate electrode and the source electrode of the field effect transistor. This has the advantage that the field-effect transistor is substantially fully cut off, thereby further reducing the dissipation of the switched-mode power supply.

A further embodiment of a switched-mode power supply in accordance with the invention is characterized in that the transformer further comprises a feedback winding, this feedback winding being coupled to a series arrangement of a rectifier element and a buffer capacitor, the rectifier element and buffer capacitor being connected in an external supply terminal for supplying an external supply voltage, and the start-up circuit further comprises a current source coupled between the source electrode and the external supply terminal, to receive the external supply voltage. During the start-up phase, the current source charges the buffer capacitor, as a result of which the external supply voltage continually increases. The required electronic control circuitry for controlling the switching means, this control circuitry being coupled to the internal supply terminal, becomes operative once the external supply voltage has become sufficiently high. The electronic control circuitry ensures that the switching means is alternately turned on and turned off. This results in an alternating current through the primary winding of the transformer, thereby causing a voltage to be induced in the feedback winding. The induced voltage is rectified by a rectifier element and thus forms the external supply voltage on the external supply terminal. This completes the start-up phase. After the start-up phase, the start-up circuit is disabled in order to achieve a further reduction of the dissipation.

BRIEF DESCRIPTION OF THE DRAWING

The invention will be described in more detail with reference to the accompanying drawing, in which:

The sole FIGURE shows an electrical circuit diagram of an embodiment of a switched-mode power supply in accordance with the invention.

DESCRIPTION OF THE PREFERRED EMBODIMENTS

The embodiment of a switched-mode power supply as shown in the FIGURE comprises a transformer TR having a primary winding P, a secondary winding A coupled to a load $Z_L$, and a feedback winding F coupled to a series arrangement of a rectifier element D1 and a buffer capacitor C, a junction between said rectifier element D1 and the buffer capacitor C being connected to an external supply terminal VAUX for supplying an external supply voltage with respect to a ground terminal GND. The first primary terminal 1 is coupled to receive a voltage U with respect to the ground terminal GND. The second primary terminal 2 is coupled to the drain of the MOSFET SM forming the switching means. The MOSFET SM has its source coupled to the ground terminal GND. The switched-mode power supply further comprises a start-up circuit ST which supplies an internal supply voltage to the internal supply terminal VINT. For this purpose, the start-up circuit ST comprises a field-effect transistor T of the normally-on type, for example a JFET, which has its drain connected to the second primary terminal 2. A resistor R is coupled between the gate and the source of the field-effect transistor T.

To stabilize the internal supply voltage with respect to the ground terminal GND, a voltage stabilizer VS is coupled to the source of the field-effect transistor T and to the internal supply terminal VINT. The voltage stabilizer VS may comprise, for example, a series arrangement of a resistor RVS and a zener diode ZD, this series arrangement having a common node connected to the gate of a field effect transistor TVS, the field effect transistor TVS has its drain connected to the source of the field-effect transistor T and has its source connected to the internal supply terminal VINT. The resistor RVS has one electrode connected to the source of the field-effect transistor T. The zener diode ZD has one electrode connected to the ground terminal GND. The field-effect transistor TVS is arranged as a source follower, as a result of which the internal voltage is equal to the voltage across the zener diode ZD minus the gate-source voltage of the field-effect transistor TVS.

A pulse-width modulator PWM is supplied with voltage in that the pulse-width modulator PWM is coupled between the internal supply terminal VINT and the ground terminal GND. The pulse-width modulator PWM has an output terminal 3 coupled to the gate of the MOSFET SM. Furthermore, to charge the buffer capacitor C during the start-up phase, a controllable current source CS is coupled between the source of the field-effect transistor T and the external supply terminal VAUX. The value of the current supplied by the controllable current source CS is dependent upon the external supply voltage on the external supply terminal VAUX. For this purpose, the current source CS has a control electrode CE coupled to a start-up control circuit STCNTL which is coupled to the external supply terminal VAUX. In dependence upon the external supply voltage, the start-up control circuit STCNTL determines the voltage on the control electrode CE of the current source CS. The start-up circuit ST further comprises a switching transistor STRST having a main current path coupled between the gate of the field-effect transistor T and the ground terminal (GND). The switching transistor STRST has its control electrode coupled to the start-up control circuit STCNTL to receive a SET/RESET signal.

The start-up circuit ST further comprises a unidirectional element formed by a diode D2 coupled between the internal supply terminal VINT and the external supply terminal VAUX.

The circuit operates as follows. It is assumed that initially, the respective voltages on the internal supply terminal and the external supply terminal VINT, VAUX are equal to the voltage on the ground terminal GND and that the switching transistor STRST and the MOSFET SM do not conduct. The field-effect transistor T conducts, as a result of which the internal supply voltage on the internal supply terminal VINT rises rapidly to a given value. Since only a small constant current flows through the primary winding P of the transformer T, the voltage on the second primary terminal 2 is substantially equal to the voltage U. Although the value of the internal supply voltage is adequate to power the pulse-width modulator PWM, the pulse-width modulator PWM does not yet become operative. As a matter of fact, the pulse-width modulator PWM does not become operative until the value of the external supply voltage on the external supply terminal VAUX has become sufficiently large, which is achieved under control of a control signal on a communication line STRSTLN coupled between the start-up control circuit STCNTL and the pulse-width modulator PWM. The reason for this is as follows. When the MOSFET SM is conductive, the voltage on the second primary terminal 2 is substantially equal to the ground terminal GND. As a consequence of this, the switching transistor T is turned off immediately, so that the internal supply voltage again becomes equal to the voltage on the ground terminal GND. As a result, the pulse-width modulator PWM and, consequently, the MOSFET SM would be turned off immediately. In order to preclude this, the buffer capacitor C is allowed to be charged to a sufficient extent by the current source CS. The time required for charging the buffer capacitor C is independent of the voltage U. Since the start-up time of the switched-mode power supply is mainly determined by the time required for charging the buffer capacitor C the start-up time of the switched-mode power supply is also substantially independent of the voltage U. It is not until the buffer capacitor C has been charged to a sufficient extent that the pulse-width modulator PWM becomes operative. The internal voltage will then remain sufficiently large because the internal supply terminal receives power from the charged buffer capacitor C, which is coupled to the internal supply terminal VINT by means of the diode D2.

The pulse-width modulator PWM will now remain operative, so that the MOSFET SM is alternately turned on and turned off, thereby producing an alternating current through the primary winding P of the transformer TR. As a result of this, a voltage is induced both in the secondary winding S and in the feedback winding F. The buffer capacitor C is further charged by the feedback winding F.

The start-up phase has now been completed. The start-up circuit STCNTL supplies a RESET signal to the control electrode of the switching transistor STRST, causing this transistor to be turned on. As a result, the field-effect transistor T remains cut off permanently, so that the current source CS is also turned off permanently. This precludes unnecessary dissipation of the switched-mode power supply. If a minimal dissipation of the switched-mode power supply is considered to be less important, the resistor and the switching transistor STRST may be dispensed with. The gate of the field-effect transistor T should then be connected to the source of the field-effect transistor T or to the ground terminal GND. The field-effect transistor T will then not be turned off permanently after the start-up phase but it will merely be turned off automatically when the MOSFET SM is conductive, because the voltage on the second primary terminal 2, with respect to the voltage on the ground terminal GND, is then substantially zero. The internal supply voltage is derived from the external supply voltage by the coupling via the diode D2.

If the current source CS is a controllable current source, the current supplied by the current source CS can be low, for example, under control of the start-up control circuit STCNTL, as long as the external voltage does not exceed a threshold value, for example 0.5 V. If the external voltage exceeds the threshold value, the current supplied by the current source CS can then be substantially larger in order to ensure rapid starting of the switched-mode power supply. An advantage of this is that in the case of overloading of the switched-mode power supply, for example, due to a short-circuit of the external supply terminal VAUX to the ground terminal GND, so that the external supply voltage VAUX cannot exceed the threshold value, the current supplied by the current source CS remains low, thereby avoiding unnecessary dissipation. Another advantage is that by means of a comparatively cheap switch, for example, a transistor, the switched-mode power supply can simply be set to a standby mode by short-circuiting the external supply terminal VAUX deliberately to the ground terminal GND by the switch, as a result of which the current supplied by the current source CS is small. Thus, it is achieved that the dissipation of the switched-mode power supply in the standby mode is low.

Except for the field-effect transistor T, other types than the types shown in the FIGURE can be used for the transistors. Furthermore, other electrical components than transistors, such as, for example, thyristors, can be used for the switching means SM. The current source CS need not necessarily be controllable and can even be realized by a resistor. The switched-mode power supply can be implemented in an integrated circuit but also by means of discrete components.

What is claimed is:

1. A switched-mode power supply comprising:
   a transformer (TR) provided with a primary winding having a first primary terminal coupled to receive a voltage with respect to a ground terminal, and a second primary terminal;

switching means coupled between the second primary terminal and the ground terminal; and a start-up circuit for starting up the switched-mode power supply, said start-up circuit comprising a field-effect transistor of the normally-on type having a drain electrode coupled to the second primary terminal, a source electrode, and a gate electrode, characterized in that the start-up circuit further comprises:

a voltage stabilizer, for supplying an internal supply voltage to an internal supply terminal, said voltage stabilizer being coupled to the source electrode.

2. A switch-mode power supply as claimed in claim 1, characterized in that the gate electrode is coupled to the source electrode.

3. A switched-mode power supply as claimed in claim 1, characterized in that the gate electrode is coupled to the ground terminal.

4. A switched-mode power supply as claimed in claim 1, characterized in that the switched-mode power supply further comprises a resistor for coupling the gate electrode to the source electrode, and the start-up circuit further comprises a switching transistor having a main current path coupled between the gate electrode and the ground terminal.

5. A switched-mode power supply as claimed in claim 1, characterized in that the transformer further comprises:

a feedback winding; and a series arrangement of a rectifier element (D1) and a buffer capacitor coupled to the feedback winding, a junction between the rectifier element and the buffer capacitor being connected to an external supply terminal for supplying an external supply voltage.

6. A switched-mode power supply as claimed in claim 5, characterized in that the start-up circuit further comprises a current source coupled between the source electrode and the external supply terminal.

7. A switched-mode power supply as claimed in claim 6, characterized in that the current source comprises a control electrode for receiving a control signal for controlling the current source, said control signal being dependent upon the external supply voltage.

8. A switched-mode power supply as claimed in claim 5, characterized in that the start-up circuit further comprises a unidirectional element coupled between the internal supply terminal and the external supply terminal.

\* \* \* \* \*